Sept. 15, 1959 C. E. LOMAX 2,904,633

PARTY LINE PAYSTATION

Filed Aug. 6, 1954 5 Sheets-Sheet 1

FIG 1 PAYSTATION P1

INVENTOR.
CLARENCE E. LOMAX

BY Wm. Watts Owen.

ATTY.

Sept. 15, 1959

C. E. LOMAX 2,904,633

PARTY LINE PAYSTATION

Filed Aug. 6, 1954

5 Sheets-Sheet 2

INVENTOR.
CLARENCE E. LOMAX

BY Wm. Walter Owen.

ATTY.

INVENTOR.
CLARENCE E. LOMAX
BY Wm. Walter Owen
ATTY.

INVENTOR.
CLARENCE E. LOMAX
BY Wm. Walter Owen
ATTY.

Sept. 15, 1959 C. E. LOMAX 2,904,633

PARTY LINE PAYSTATION

Filed Aug. 6, 1954 5 Sheets-Sheet 5

INVENTOR.
CLARENCE E. LOMAX

BY Wm. Watts Owen.

ATTY.

United States Patent Office 2,904,633
Patented Sept. 15, 1959

2,904,633

PARTY LINE PAYSTATION

Clarence E. Lomax, Chicago, Ill., assignor to General Telephone Laboratories, Incorporated, a corporation of Delaware Application August 6, 1954, Serial No. 448,268

17 Claims. (Cl. 179—17)

Figure 1:
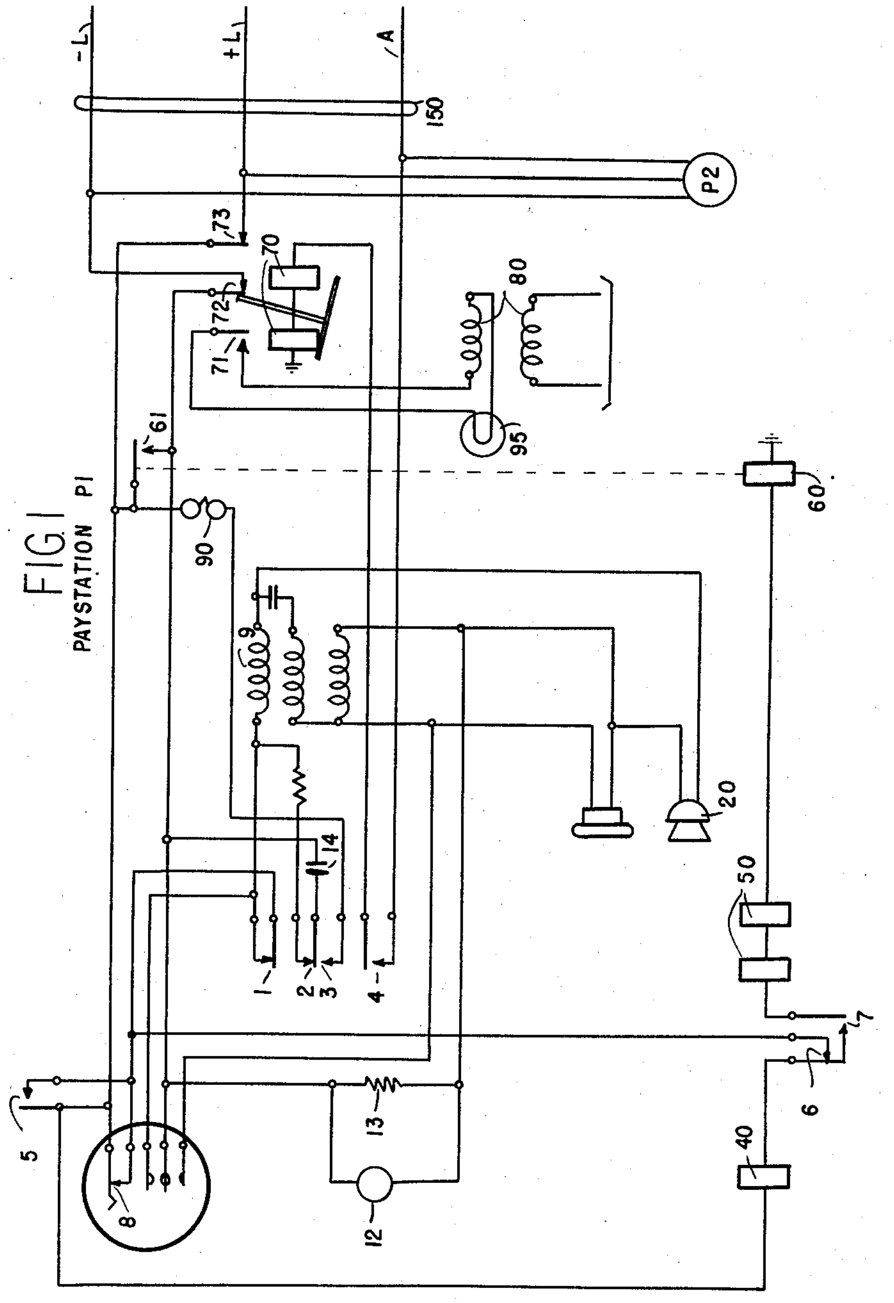
Figure 2:
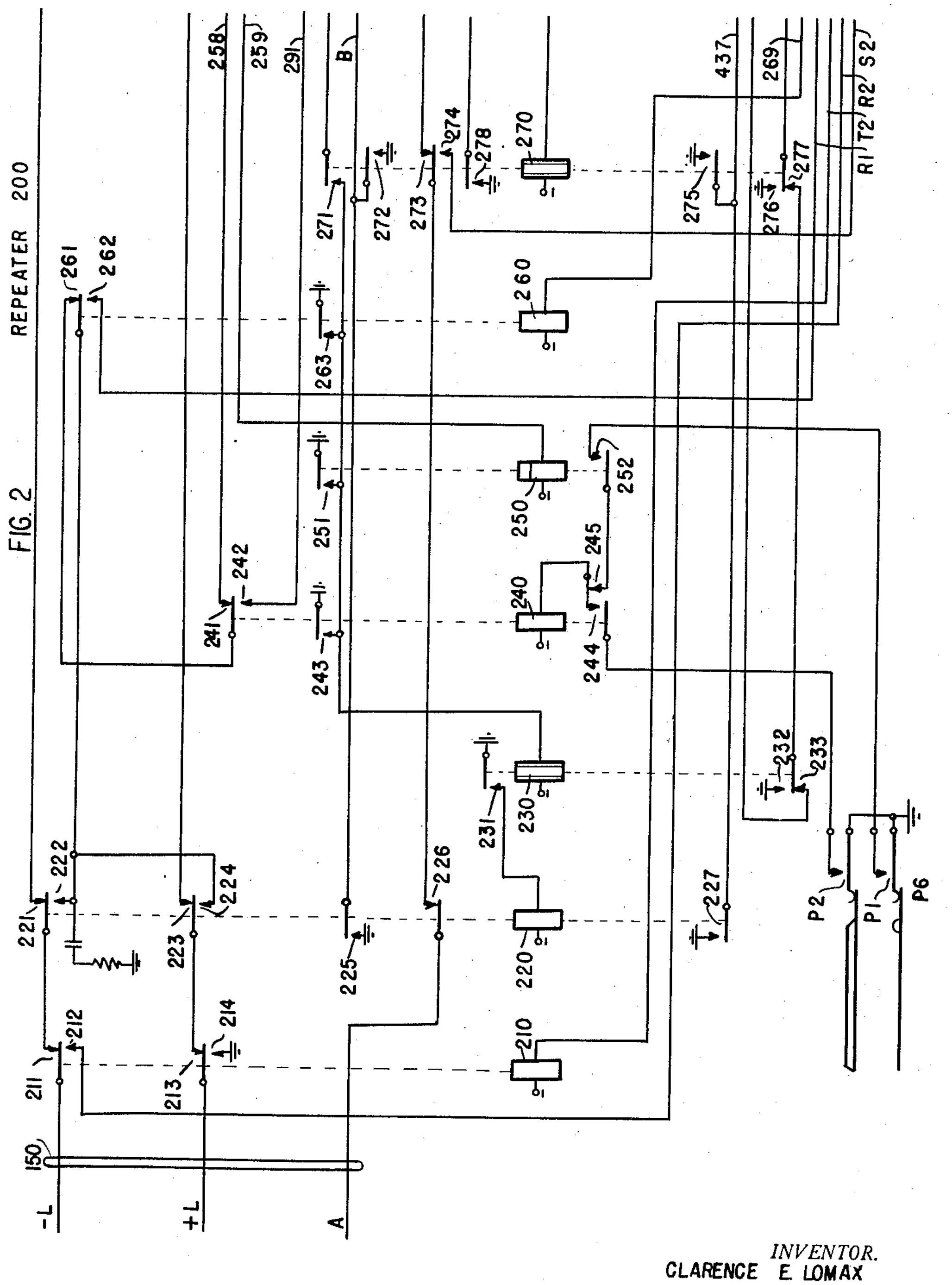

This invention relates to telephone systems in general and in particular to a party line arrangement for a telephone system in which substations on the party or common line have measured service equipment.

With vastly expanded transportation facilities a problem has arisen in providing easily accessible communication means for those using rural highways. The prevalent form of communication facilities for transients are telephone substations, having measured service equipment including coin controlled and controlling devices, commonly known as paystations. They generally each have an individual line to the central office equipment for extending a call and are of a prepay type wherein a coin or coins must be deposited before the equipment at the central office can be controlled for extending either a local or a toll call. In urban areas the problem and expense of providing an individual line per paystation is not severe as the lines are not of great length. However, in providing paystation service for transients in rural areas, it is desirable because of the great distances involved, that party line paystations be provided, as they are served by a common line to the central office. This arrangement gives rise to a number of difficulties in that the coin magnet to be operated at any particular station has in shunt therewith equipment at other stations on the same line. The coin magnet may therefore not operate properly to refund or collect deposited coins as it may not receive its full operating voltage. The difficulties are further complicated as it is necessary to provide secret service for a calling station by locking out other party line stations and still enable the calling station on the line to call another station thereon (reverting call service); operate the coin magnet at the calling station properly under such and other circumstances; prevent a non-calling station from being improperly locked-out; provide a signal at locked-out stations to indicate such a condition and enable the calling station to secure various services without endangering the completion of his connection.

The present system is arranged to provide completely automatic service to a party initiating a call from one of said party line paystations to any local subscriber, and to provide both toll and reverting call service with the aid of an operator. The coin magnet is controlled automatically from the central office equipment for either a collect or refund operation on a local call and a collect operation on a completed toll or reverting call, but is manually controlled from an operator's position on an uncompleted toll or reverting call. It is intended that the circuits illustrated herein will function with the well-known Strowger step-by-step switching equipment indicated in the drawings in block form although the invention is by no means limited to the use of such switches.

The present invention is therefore arranged to provide a prepay party line paystation telephone system utilizing a lock-out relay at each station for locking out non-calling or non-called stations and controlled by equipment at both the central office and at each paystation, and equipment operative for the purpose of providing the above services and eliminating the aforementioned and other problems economically and in an improved manner.

Fig. 1 discloses the details of one party line paystation circuit and shows another paystation indicated by the reference character P2 connected to the same line. A total of four stations are to be considered as being connected to the line 150, although all are not shown, nor is the grouping necessarily limited to four.

Figs. 2, 3, 4 and 5 together disclose the repeater circuit 200, individual to line 150 and therefore common only to the four stations on line 150. A number of such repeaters may be provided in the exchange, one for each group of party line paystations connected to a single line, however for our purposes the description will generally proceed as though only repeater 200 is in use. The repeater circuit terminates at a number of operator positions, only one of which is indicated here by jacks J1, J2 and J3 in Figs. 4 and 5. The operator has access to jack J1 through any well-known type of cord circuit for the purpose of talking to a calling party line subscriber or extending and controlling a talking connection to another party from or to a party line subscriber; to jack J2 through coin cord 520 and to jack J3 through ringing cord 510. The use of an individual repeater circuit for each party line is dictated only by economic reasons as a great number of party line paystations are not necessary in any one exchange. The control equipment included in the repeater circuit can easily be included in finder-selector links if there are larger number of party lines, but this would necessitate the installation of such equipment in all links having access to the party lines.

A calling party initiates a call from one of the paystations in the usual manner by lifting his handset and depositing the proper coin value. The present invention is intended for use with a two nickel or one dime paystation mechanism such as disclosed in Patent No. 2,674,655 issued to Gallagher on April 6, 1954, wherein a calling party must deposit either one dime or two nickels before the dial springs 8 can be operated effectively. A restoring magnet 40 operated in conjunction with the coin magnet 50 opens the nickel springs 5 if they are not previously restored to normal while 50 resets the other equipment to its original position on termination of a call. The repeater circuit 200, common to the four parties, is not seized until a first nickel is deposited. On seizure the repeater sends a momentary lock-out pulse over lead A to operate the lock-out relays corresponding to 70 at all stations on the party line for disconnecting all stations from line 150 except the calling station. The circuit to the calling station's lock-out relay is opened at springs such as 4. The lock-out relay may be any well-known polarized type relay having a permanent magnet for retaining the stay put armature 71 in the position to which it is thrown. In keeping with the general practice, +110 volt battery is used to operate the coin magnet such as 50 to collect a deposit and −110 volt battery is used to refund a deposit. The same potentials are used to operate the lock-out relays to the off or unlocked position and to the locked or on position respectively.

Figure 4:
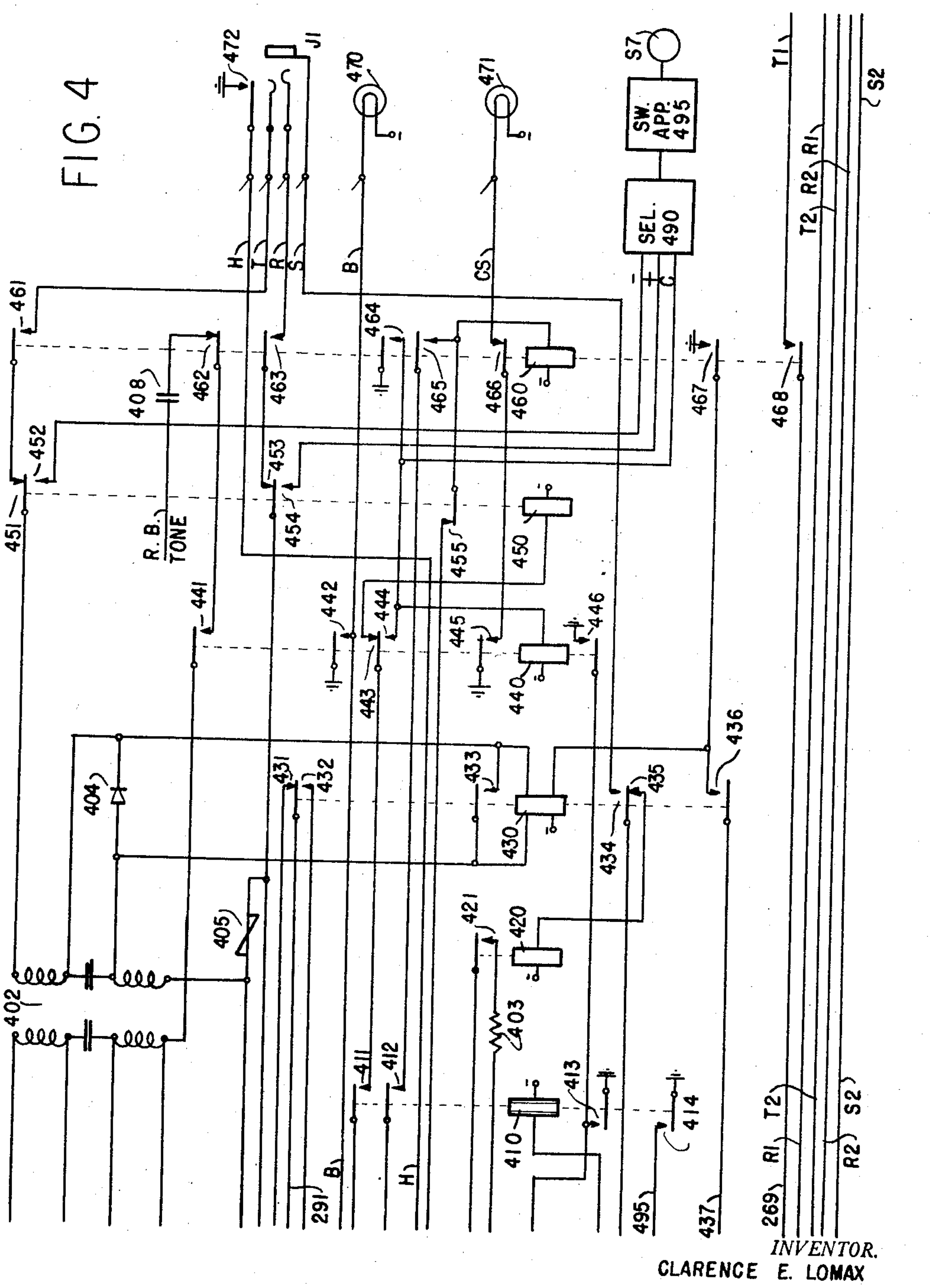

The repeater circuit in this instance has the Strowger selector switch 490 individual to the repeater 200. The first digit dialled by a party at a party line station desiring to call another party on the same line (reverting call) or toll is zero. The selector switch is thereby operated to the tenth level where its normal post springs (not shown) close contacts to return ground back to the repeater to cause the repeater to release selector 490 and signal the operator by lighting a lamp such as 471. Any other well-known type of means may be provided at the selector for returning ground in the event a reverting call is begun by dialling a predetermined digit other than zero. If the call is a local one, selector 490 is operated to some level besides the tenth, where it hunts for and seizes idle switching apparatus 495 (including a connector switch seized either after a second digit is dialled or after the first digit is dialled) in the well-known manner. The number of digits dialled is of course dependent on the size and arrangement of the system in which the present invention is utilized. The repeater is arranged to prevent interference by an operator on any call not routed to the operator. The switching apparatus is then operated by the other digits to connect to a desired called subscriber such as S7. Battery on the leads + and − Fig. 4 is reversed by the connector on answer by the called party to operate relay 430, and at the end of the call the repeater automatically collects the deposit and applies unlocking potential to the locked out stations. If any call is terminated by the calling party before answer by either the operator or a called party the repeater automatically causes the coin magnet at the calling station to refund the deposit and applies unlocking potential to the lock-out relays at all stations to connect the trunk conductors +L and −L of line 150 to all stations.

A busy lamp such as 470 at each operator's position is lighted, whenever the repeater is seized. If signalled by a lamp such as 471, as on a toll or reverting call, one of the operators inserts her plug in a jack such as J1 and completes a talking connection to the calling party. On securing the desired information, she completes the call, if it is a toll call, through her cord circuit (not shown). She may before extending the connection or at any time she has access to repeater 200 manually collect or refund coins. On completion of the toll call, the repeater which was thrown into the collect position by operation of relay 430 on answer by the operator, collects the coins that are on deposit. If it is a reverting call, she instructs the calling party to hang up while she rings the called party. Reverting calls although probably not important to transients must be provided for those inhabiting or working in the area who must have service to others on the line. Both calling and called parties are rung periodically. A harmonic ringing frequency individual to the called station is applied from a key such as K4, K5, K6 or K7 for operating the desired ringer such as 90 to signal the called station. She accomplishes the ringing operation by first unlocking all the stations on the line through a key K8 associated with ringing cord 510 now inserted in jack J3, and then periodically operating one of the aforementioned keys individual to the called party's frequency as indicated by the last digit of the called party's number to signal the called party. The calling party's ringer is operated by alternately operating a key associated with cord 510 individual to his frequency. He is instructed that if his ringer is not operated periodically to come back on the line. If the called party does not answer the operator manually refunds the deposit. When the call is answered, the operator is signalled. She stops ringing and the calling party then comes on the line. The operator now momentarily applies lock-out battery to the other stations, and removes her plug. The repeater 200 automatically operates the coin magnet such as 50 at the calling station to collect the deposit on termination of the call. The operator is signalled, when either the calling or called party comes on the line, by a cord circuit lamp (not shown), which is operated from the repeater. Only the first party to come on, signals the operator through her cord lamp. The operator performs all functions through the repeater common to the party lines.

It will be noticed that the calling party on a toll call or either party on a reverting call (if the other has hung up) may flash the operator's cord lamps by jiggling his hookswitch several times to quickly open and close the loop to the repeater accordingly without running the risk of being locked out when springs such as 4 close, as the lock-out pulse to the various lock-out relays was on only momentarily when the repeater was initially seized. The operator at this time may desire to test to see if a coin is on deposit before performing any services for the party. This she does by inserting coin cord 520 in jack J2 and operating key K3 to light lamp 540 if a coin is on deposit. She may then act accordingly, and if any doubt exists as to amount, she may refund by operating key K1 to apply refund potential to the appropriate coin magnet. If she desires to collect a coin she operates key K2 to apply collect potential to the coin magnet.

If the call is a delayed toll call she may refund the deposit through cord circuit 520 after instructing the calling party to hang up. She then unlocks all the stations by operating key K8 with cord 510 inserted in jack J3 to permit calls to be established, while she secures the called party. She waits until repeater 200 is idle and rings back the calling party while holding the called party. Before completing the talking connection through her cord circuit in any well-known manner she requests the deposit of the proper coin value from the calling party. The repeater automatically collects the deposit on termination of the call. The operator has access, at any time the repeater 200 is idle, to any of the parties on the line by merely inserting her ringing cord 510 in jack J3, operating the appropriate ringing key and inserting her cord circuit in jack J1 to complete a talking circuit to the called party when he comes on the line.

Reverse charge calls must be completed from an operator having direct access to repeater 200. She completes the connection through her cord circuit from the incoming toll operator by first signalling the desired station as described and requesting the proper coin deposit which the repeater automatically collects on release of the connection.

Incoming calls from a local subscriber such as S8 or a toll operator, who need not secure a coin deposit from the called party, are completed over switching apparatus such as 390 and a connector such as 395. Connectors such as 395 having access to the paystation repeaters are arranged to provide harmonic ringing individual to the called station, through the repeater, on the dialling of a last digit on the connector. This arrangement is very generally used for connectors having access to party lines. For the purpose of illustrating the manner of operation of the invention, connector 395 is described as a three digit connector, although many other arrangements may be provided such as one wherein each connector having access to the party lines is arranged to provide a frequency individual thereto and individual to one station on the party line. The connector is of course seized after an appropriate number of digits are dialled over the selector switches included in switching apparatus 390. On a call directed to a party line, assuming a three digit connector is used, the first two digits control the connector to connect to the desired party line while the third digit controls the connector to select a frequency individual to the called station on the party line and apply the selected frequency to the line for signalling the called party. The repeater is busied to other incoming calls at the connector banks and to the operator and on answer by the called party automatically locks out the non-called stations.

*Outgoing local call*

Figure 3:
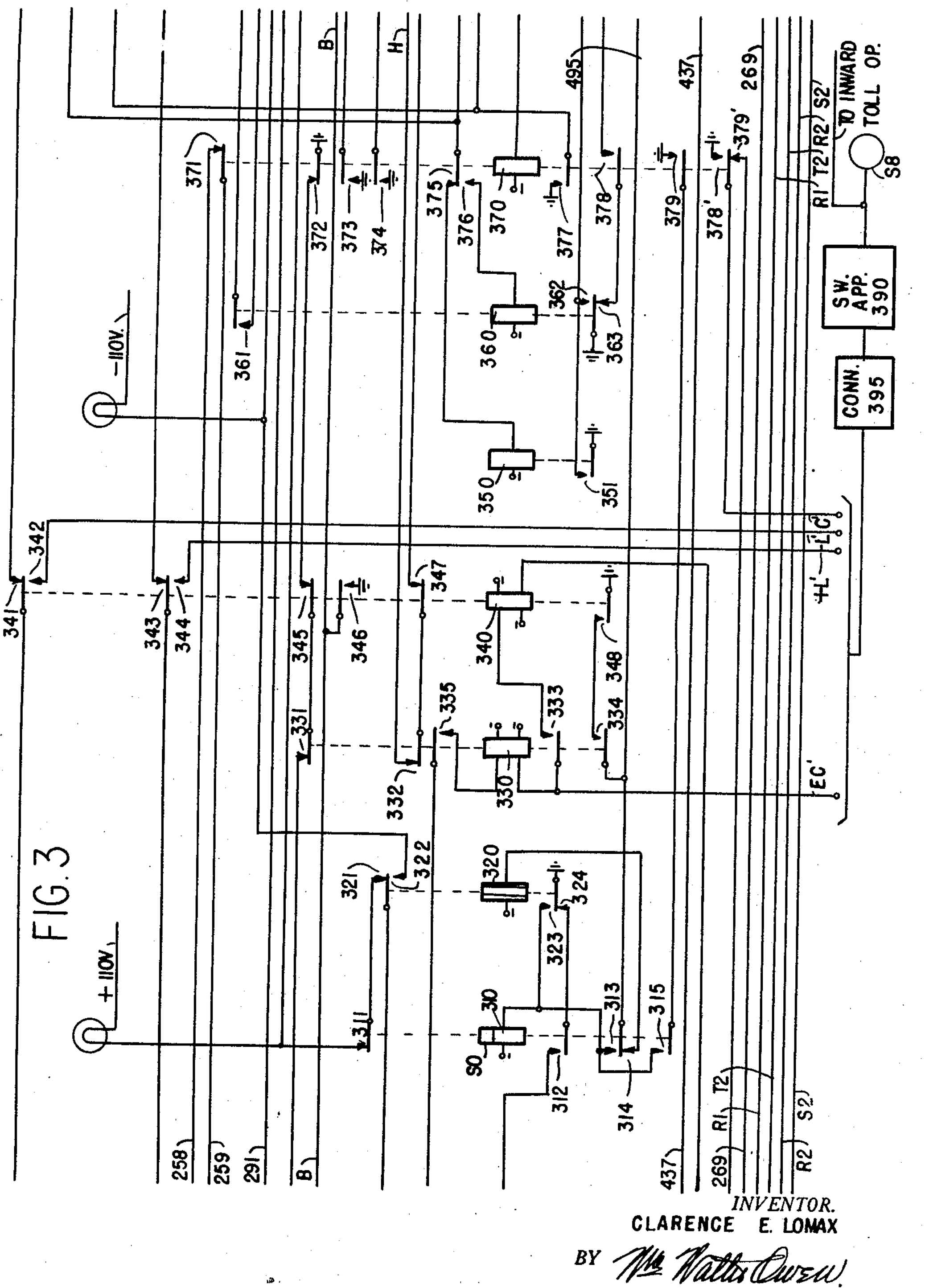

Whenever repeater 200 is idle, indicating that the handset at each station is on its respective hookswitch, +110 volt battery from Fig. 3 is returned over contacts 311, 321, 273, 226 and lead A, through springs 4 at station P1 and springs corresponding thereto at other party line stations and both windings of lock-out relay 70 and a relay corresponding thereto at each said stations to ensure that the lock-out relay at each station is in its off position. The stay put armature at each lock-out relay maintains contacts corresponding to 72 and 73 at each station closed so that the line conductors −L and +L are normally connected to each of the party line paystation circuits. A small permanent magnet associated with each stay put armature actually holds the armature in the off position, however the +110 volt battery is continuously applied to ensure its being brought into such position, whenever proper, as will be explained.

Removal of the handset at station P1 (assumed to be the calling party line station) from its hookswitch, closes springs 1 and 2 and opens springs 3 and 4. Opening of springs 3 removes the ringer 90 from across the line, while opening of springs 4 disrupts the previously described circuit for ensuring that relay 70 is in its off position. However, the previously described construction for relay 70, including the permanent magnet, maintains its armature in the position shown so that contacts 72 and 73 remain closed. No circuit is completed to the repeater 200 to enable completion of a call or operation of the lock-out relay at each other party line station to its on or locked position until a coin is deposited.

In accordance with the standard practice and as described in the aforementioned patent shunt springs 5 are closed on the deposit of a nickel while coin springs 6 are opened and 7 closed. The deposit of a second nickel merely opens shunt springs 5. The deposit of a dime does not effect springs 5, however it does close springs 7 and open springs 6. The deposit of a first nickel completes a circuit from ground on the right of relay 60 through coin magnet 50, springs 7, restoring magnet 40, springs 5 and 8 in shunt, springs 1, coil 9, voice transmitter 20, coin transmitter 12 and resistor 13 in shunt, contacts 72, the −L line, contacts 211, 221, contacts 341 in Fig. 3, the upper primary of repeating coil 402 in Fig. 4, contacts 375 through the winding of relay 350 to battery. Deposit of a dime completes the same circuit with the exception that springs 5 remain open.

Relay 350 only, being of high resistance, operates in this circuit to close contacts 351 and complete an obvious circuit to slow-to-release relay 410 in Fig. 4. Relay 410 closes contacts 411, 412, 413 and 414. At contacts 413 an obvious circuit is completed to relay 370 which operates to ground lead C′ at contacts 378′ and busy the repeater 200 to incoming calls from a connector switch such as 395. It also disrupts the previously described operating circuit for relay 350 at contacts 375 and completes a loop circuit for relay 360 over contacts 376, the upper primary of coil 402, contacts 341, 221, 211, the −L line, the paystation loop comprising contacts 72, coin transmitter 12 and resistor 13 in shunt with each other, speech transmitter 20, coil 9, springs 1, dial springs 8 and springs 5 in shunt therewith if only a nickel has been deposited and contacts 73 then back over the +L line, contacts 213, 223, 343, the lower primary of repeating coil 402 to ground at contacts 377. Omitting shunt springs 5 and including shunt springs 6 and magnet 40 instead only on incoming calls, this circuit comprises the paystation talking circuit whereby speech currents are transmitted through repeating coil 402 at the appropriate time. It will be noticed that the ground on the +L line now shunts restoring magnet 40, coin magnet 50 and relay 60. Springs 5 are effective if only one nickel has been deposited to prevent the transmission of dial pulses to pulse the selector line relay (not shown) in a manner to be described. Deposit of a second nickel simply opens springs 5 to permit effective operation of the dial while deposit of a dime in place of the two nickels results in the operation of relays 350, 410, 370 and 360 as previously described with the exception that shunt springs 5 are not closed at any time. Also at contacts 378′ ground is forwarded over lead C′ to busy the repeater 200 to incoming calls from connector 395.

Returning momentarily to contacts 414 closed by relay 410, it will be seen that a circuit was completed over lead 495 and contacts 314 to slow-to-release relay 320. Slow-to-release relay 320 operated to open contacts 321 and remove the +110 volt potential from lead A and close contacts 322 to apply −110 volt potential over contacts 273 and 226 to lead A for operating the lock-out relay corresponding to relay 70 at the non-calling stations to their on or lock-out position. As the hookswitch springs at each non-calling station are unoperated the circuit to each lock-out relay is completed over springs corresponding to 4 at those stations. The lock-out relay corresponding to 70 at each non-calling station then operates its armature to a position opposite to that shown in Fig. 1 to open the contacts corresponding to 72 and 73 and close contacts corresponding to 71 at those stations. The armature of each lock-out relay remains in that position for the reasons previously described. It is now impossible for a subscriber at any of the other stations to remove his handset from the hookswitch and deposit any coins to complete a circuit to any relay in the repeater nor can he at his own discretion be connected to the +L and −L leads or otherwise interfere with a call. Contacts corresponding to 71 on closing complete a circuit through the secondary of a transformer such as 80 to provide power from a commercial source at each paystation for lighting lamp 95 so that any party desiring to make a call from a locked out paystation is warned that the particular station is locked out and it is futile for him to initiate a call.

Relay 320 also completes an obvious circuit at contacts 323 for slow-to-operate relay 310, which operates to open contacts 311 and at contacts 312 prepares a circuit to slow-to-release relay 270. At contacts 314 it opens the previously described operating circuit for relay 320 and it starts to release. Relay 320 is always operated on an outgoing call and also on an incoming call from connector 395, over another circuit, to operate relay 310 and is thereafter always released to operate relay 270 as will be explained shortly. At contacts 313, relay 310, completes a holding circuit for itself over conductor 495 from ground at contacts 414. An alternate holding circuit for relay 310 is completed over contacts 315 and previously closed contacts 379. When relay 320 releases a circuit is completed over contacts 324 and previously closed contacts 312 to slow-to-release relay 270 and it operates. Relay 270 operates to close contacts 271, 272, 274, 275, 276 and 278 and open contacts 273 and 277. Contacts 276 on closing prepares a busy ground for lead C′ which will be utilized later. At contacts 273 another point is opened in the high voltage circuit to lead A. At contacts 271 a point is prepared in a circuit to relay 230 and at contacts 272 a circuit is completed over lead B for lighting busy lamp 470 at each operator's board for indicating to each operator that this particular repeater is busy.

Returning now to operated relay 370 it will be noticed that a circuit was completed, before relay 360 operated, from ground at contacts 363 over contacts 378 and 435 to relay 420. Relay 420 operated to close contacts 421 and provide a circuit for aiding the energization of relay 360 over contacts 377, resistor 403, contacts 421 and 376. Resistor 403 is of high enough resistance to prevent the current in this circuit from operating relay 360 or holding it operated but does allow the passage of enough current to aid in its energization. When relay 360 does operate it opens the energizing circuit for relay 420 at contacts 363 which in turn opens the circuit for aiding the energization of relay 360 at contacts 421. Relay 360 at contacts 362 provides another energizing circuit for slow-to-release relay 410 as its original operating circuit is opened at contacts 351 when relay 350 releases. Relay 410 maintains its contacts operated in the interim however as it is slow-to-release. Also before relay 360 operates, relay 370 at contacts 373 completes a previously prepared circuit to relay 450 over contacts 411 and 443, which operates to close contacts 452 and 454 and thereby connect the secondary of repeating coil 402 to the line relay (not shown) of selector 490 through the silicon carbide resistor 405. The silicon carbide resistor prevents the selector line relay from operating. Relay 450 also opens contacts 451, 453 and 455 to prevent any interference with the call by an operator if she plugs into jack J1 inadvertently.

Relay 360 now operating closes contacts 361 to complete an energizing loop circuit for the selector line relay from ground on one side of the line relay over the + trunk lead, contacts 454, contacts 361 (shunting silicon carbide resistor 405), the lower secondary winding of repeating coil 402, rectifier 404 shunting the upper winding of relay 430, the upper secondary winding of coil 402, contacts 452, the — trunk lead to battery on the other side of the selector line relay. Dial tone may now be returned from selector 490 in the well-known manner over the trunk leads, repeating coil 402 and the line loop back to the calling party to inform him that the selector is seized and that he may initiate dialling.

The calling party (assuming that the proper coin value is deposited) operates his dial to open and close dial springs 8 a number of times corresponding to the digit dialled. This opens and closes the previously described loop to relay 360 a corresponding number of times and it energizes and releases a corresponding number of times. Relay 360 on releasing closes the previously described circuit to relay 420 which energizes to complete the previously described circuit for aiding the energization of relay 360 after each release so that relay 360 is fully energized on each closing of the dial springs 8. This special energizing circuit is provided because relay 360 is in a high resistance line and therefore would tend to have an excessive release period. The selector line relay is pulsed at contacts 361 so that the selector is operated in the well-known manner to a position corresponding to the digit dialled. The silicon carbide resistor 405 bridged across the pulsing springs 361 slightly delays the release of the selector line relay when contacts 361 open as the selector line relay provides an inductive kick that lowers the resistance of the resistor momentarily. The resistor also serves to protect the pulsing springs 361. Its use is preferred to that of a condenser, which may discharge and quicken the release of the selector line relay. This can be a problem in the case of a slow dial, as relay 360 provides a long open pulse due to its being in a high resistance line.

Assuming that this is a local call, the selector 409 is operated to any level but the tenth on the first digit and then hunts for and finds in the well-known manner an idle selector or connector such as is indicated by the block marked switching apparatus 495 and extends an energizing loop including the secondary coil 402, contacts 361 and the + and — leads respectively to the line relay (not shown) of the next switch. A series of digits then dialled by the calling party operates relay 360 a corresponding number of times to in turn open and close contacts 361 correspondingly and operate the following switching equipment 495 including a connector to a position corresponding to the series of digits dialled. It then connects to a local subscriber such as S7, applies ringing current to the called line and returns ring back tone back over the connector energizing loop, repeater 402 and the loop back to the calling party, if the line of subscriber S7 is idle. The calling party then knows the called party is being rung. Otherwise busy tone is returned over the described loop to indicate the called subscriber's line is busy. The called party on answering causes the connector to reverse battery on the + and — leads in the well-known manner. When battery is reversed, rectifier 404 no longer shunts the upper winding of relay 430 and it operates in series with the energizing loop to the connector line relay to open contacts 431 and 435 and close contacts 432, 433, 434 and 436. Contacts 433 now shunt the upper winding of relay 430, however the lower winding of relay 430 is energized over contacts 436, conductor 437 and contacts 275 to maintain the contacts of relay 430 operated. Contacts 435 open a point in the circuit to relay 420 and at contacts 432 a point is prepared in a circuit to provide collect potential to the coin magnet 50 at the calling paystation.

If the called party does not answer for any reason, or if the calling party has not operated the selector or succeeding switches, battery is not reversed on the + and — leads, and relay 430 is not operated. The calling party on replacing his handset opens hookswitch springs 1 and closes 4 to respectively open the loop to relay 360 and reconnect lock-out relay 70 to lead A. Relay 360 releases to release the selector switch line relay at contacts 361 and the selector releases. At contacts 362 the circuit to relay 410 is opened, and it releases after a period of time to in turn release relay 370 at contacts 413. Relay 420 is energized over its previously described energizing circuit on release of relay 360 and before release of relay 370, but as before explained does not operate relay 360. Relay 410 also opens one of the holding circuits to relay 310 at contacts 414 and at contacts 411 opens the circuit to relay 450, which restores to disconnect the secondary of coil 402 from the + and — leads. Relay 370 on releasing opens another holding circuit to relay 310 at contacts 379, and relay 310 now releases to close contacts 311 to prepare a point in the circuit for placing +110 volt battery on lead A and at contacts 312 opens the circuit to relay 270, which being slow-to-release does not yet restore. Contacts 378′ on opening removes one ground from lead C′, however contact 379′ close to maintain lead C′ grounded to busy the repeater from contacts 276.

Relay 370 on releasing also closed contacts 372, before relay 270 is released, to complete a circuit over contacts 345, 331 and 271 to operate slow-to-release relay 230. At contacts 232 a ground for maintaining the repeater busy is forwarded over contacts 277 and 379′ when relay 270 is restored. Relay 230 also operates to complete an obvious circuit for relay 220 at contacts 231. Relay 220 operates and opens another point in the previously described lock-out circuit at contacts 226 and at 225 maintains lamp 470 lighted over lead B and closes contacts 227 for no purpose now. Contacts 226 and 225 respectively are provided because relay 270 will shortly close contacts 273 and thereby attempt to forward +110 volt unlocking battery over lead A and open contacts 272 to disrupt the circuit to busy lamp 470. Relay 220 closes contacts 224 to complete a circuit to slow-to-operate relay 250 from battery on the left side of relay 250, conductor 259, contacts 371, conductor 258, contacts 241, contacts 261, contacts 224, the +L line, restoring magnet 40, coin spring 7, coin magnet 50, and relay 60 to ground. Relay 250 operates to close contacts 251 to provide another operating circuit for relay 230 as relay 270, when completely restored, opens the original operating circuit for relay 230 at contacts 271. At contacts 252 it prepares a circuit from the pulse sender P6 which is common to all repeaters such as 200 and is continuously operated.

When contacts P1 associated with the lower cam of the pulser P6 are closed ground is forwarded over contacts 252 and 245 to operate relay 240. Relay 240 operates to close contacts 243 to provide another holding circuit for relay 230 and closes contacts 244 to complete its own holding circuit from ground on contacts P2 which are held closed by the upper cam of pulser P6 for a predetermined time. It also opens its own previously described operating circuit at contacts 245, and at contacts 241 opens the previously described operating circuit for relay 250, which releases.

Relay 240 on operating closes contacts 242 so that —110 volt refund potential is applied over contacts 431, conductor 291, 242, 261, 222 and 224 respectively, 211 and 213 respectively to both the —L and +L conductors. As the hookswitch springs 1 are open the —110 volt potential extends only over the side of the paystation circuit connected to the +L line, restoring magnet 40, coin springs 7, coin magnet 50 and relay 60 to ground. Relay 60 being of high resistance operates first, to close contacts 61 to now apply the —110 volt potential from both sides of the line to insure the full operation of coin magnet 50 and restoring magnet 40. The restoring magnet operates to reset springs 5 if only one nickel were deposited and the coin magnet 50 operates to refund the deposited coin or coins and reset springs 6 and 7 all in a well-known manner. It will be noted that as the +L and —L conductors of line 150 are disconnected from the other paystation circuits that coin magnet 50 receives its full operating voltage.

As previously described if the call had been completed relay 430 is operated. On termination of the conversation, the calling party replaces his handset, and the loop to relay 360 is opened as before described, to initiate the afore-described sequence of operations. Relay 430 is held operated, after relay 270 releases, as relay 220 closes contacts 227 to complete a holding circuit for the lower winding of relay 430 over conductor 437 and contacts 436. Now when contacts 222, 224 and 242 are closed, +110 volt collect potential is applied over the afore-described coin magnet circuit, as contacts 431 are open and contacts 432 closed, to operate relay 60, coin magnet 50 for a collect operation and restoring magnet 40.

When the pulser completes one cycle of operation, which occurs during a predetermined time period, ground is removed from contacts P2, and relay 240 releases to open the circuit to relay 230 at contacts 243, and it in turn releases. Relay 240 is prevented from reoperating when the pulser goes through another cycle as the circuit to relay 250 is now opened at coin springs 7. As magnet 40 and 50 operate together, a failure on their part to operate and open springs 7 initiates another cycle of operations for applying coin potential to the coin magnet for disposing of an undisposed coin. Relay 230 releases after a short period of time to make the repeater available to incoming calls by removing ground from lead C′ at contacts 232 and restores relay 220 at contacts 231. Relay 220 on restoring opens the holding circuit for the lower winding of relay 430 so that it restores. At contacts 225 the circuit to lamp 470 is opened so that it darkens to indicate the trunk is idle and at contacts 226 the +110 volt unlocking potential is forwarded from contacts 311, 321 and 273 to lead A to unlock the lockout relay at each station. If a party at another station had lifted his handset after the momentary lock-out pulse sent at the beginning of the call, it will be noticed that he cannot be locked out indefinitely for the unlocking pulse is sent continuously by the repeater at the end of the call to ensure that whenever the party at the other station replaces his handset he will receive the unlocking pulse and be enabled to initiate or receive a call.

*A reverting call*

This type of call is initiated in the same manner as described for a local call to a subscriber on another line, namely; by lifting the handset and by deposit of the appropriate coin value to operate the same relays over the same circuits as previously described for seizing the selector 490. The calling party, to reach another party on the same line, dials the digit zero, and thereby operates the selector to the tenth level. The selector causes ground to be returned over lead C in any well-known manner from contacts closed by the selector normal post springs to operate relay 440, which closes contacts 441 to provide ring back tone over condenser 408, contacts 462, 441, 343, 223 and 213 to the +L lead back to the calling party's receiver so that he is informed that a signalling operation is taking place and that he should not continue to dial. Contacts 442 close to complete another circuit over lead B for holding lighted busy lamp 470 and corresponding lamps at each operator's position lighted. A holding circuit is also completed for relay 440 over contacts 373, 411 and 444. At contacts 445 a circuit is completed over contacts 466 and lead CS for lighting the calling station lamp 471, and lamps corresponding thereto at each operator's position so that they are signalled and one of them answers the call. At contacts 443 the circuit to relay 450 is opened, and it releases to open the energizing loop to the selector line relay at contacts 452 and 454 so that the selector releases in the well-known manner. At contacts 446 an alternate holding circuit for relay 370 is provided. Relay 450 on releasing prepares a circuit at contacts 455 for relay 460 to be completed when an operator answers the call.

The operator inserts her plug at jack J1 to close contacts 472 and ground lead H to complete a previously prepared circuit over contacts 332, 347 and 455 to relay 460, which operates to complete at contacts 461 and 463, a loop from her cord circuit including conductors T and R respectively, contacts 451 and 453 respectively to the secondary of coil 402 through contacts 361 and rectifier 404. She may now converse over repeating coil 402 and including the previously described paystation loop with the calling party. At contacts 462 the circuit for supplying ring back tone to the calling party is opened and at contacts 464 another holding ground is supplied to relay 440. Relay 460 completes its own holding circuit from ground at contacts 374, 412 and 465. At contacts 466 it opens the circuit to all the calling signal lamps to extinguish them, and at contacts 467 it completes a circuit to the lower winding of relay 430, which operates and closess contacts 432 to prepare for the application of collect potential to the line. At contacts 468 a circuit is prepared for providing manual coin control which will be described. The operator if she desires may now change cords without releasing the connection as relays 440 and 460 are held by relays 370 and 410.

The operator on securing the number of the desired called party instructs the calling party to replace his handset, after which, he will be rung periodically, and when the ringing has stopped he should remove his handset. When the calling party replaces his handset, springs 1 open to release relay 360 which in turn closes contacts 363 and completes a circuit to a cord lamp (not shown) over contacts 378 and 434 and lead S so that the lamp lights to indicate to the operator that the calling party has hung up. Relay 410 is deenergized, when contacts 362 open, but relay 420 is not energized when contacts 363 close as contacts 435 are open. Relay 370 does not release, when contacts 413 open, as it is held from contacts 446. Relay 310 is maintained energized, when contacts 414 open, by ground on contacts 379 to in turn maintain relay 270 energized. It will be therefore noticed that the repeater 200 cannot be seized by another party.

Figure 5:
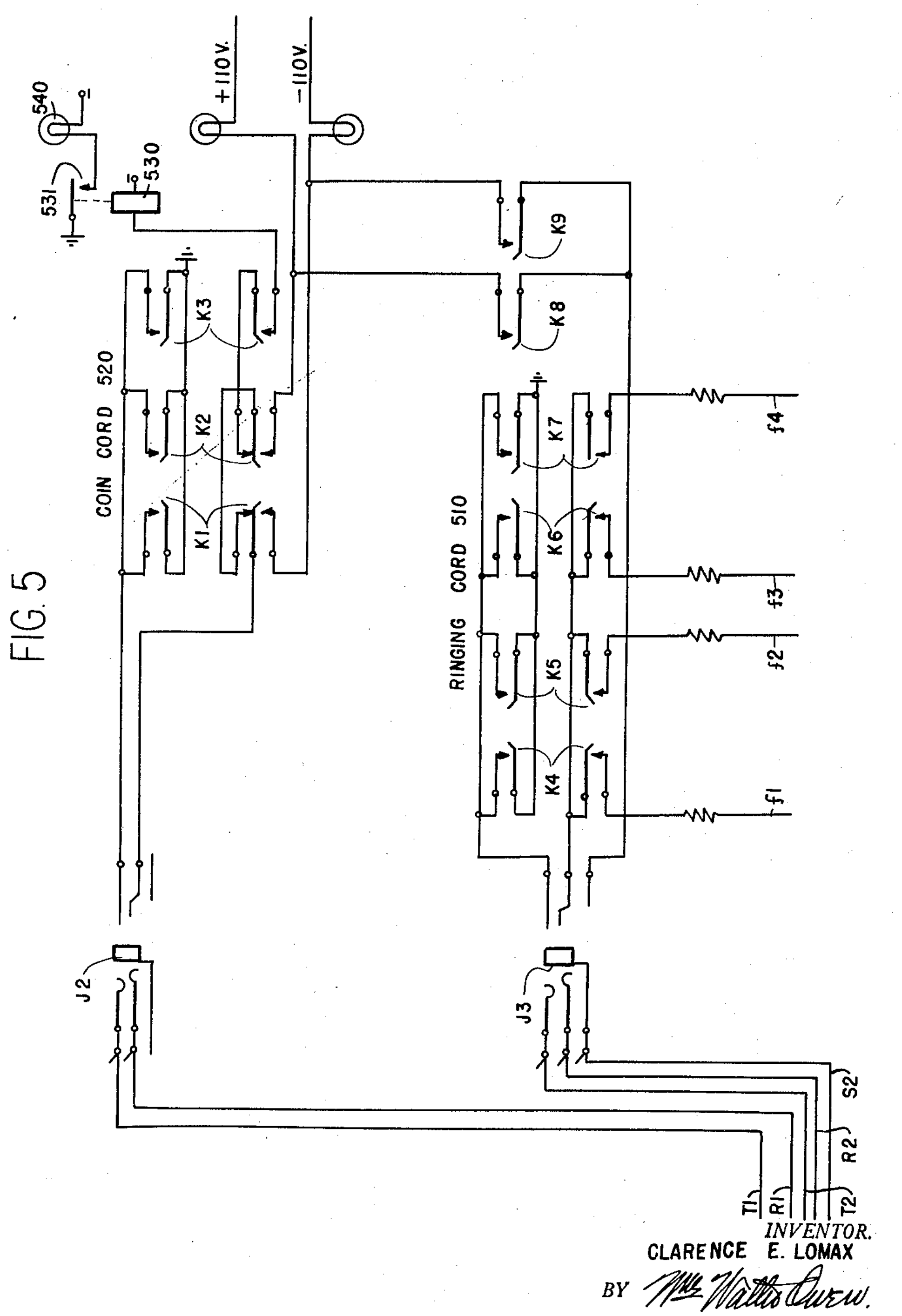

As there are only four parties on the line and the last number of the called party indicates his individual ringing frequency the operator now inserts her ringing cord 510 in jack J3 in Fig. 5 for the purpose of supplying that ringing frequency to signal the called party. The operator presses key K8 to apply +110 volt potential over lead S2, contacts 274 (already closed by relay 270) and 226 to lead A and the lock-out relays corresponding to 70 at all party line paystations so that each relay operates its respective armature to the unlocked position and connects the +L and —L conductors to each paystation at the contacts corresponding to 73 and 72 respectively. The calling station is of course also connected. The operator now alternately and periodically presses the key such as K4, K5, K6 or K7 individual to the ringing frequency of the called party and the key individual to the frequency of the calling party of that group to apply the desired ringing frequencies to the conductor R2. Before proceeding, it will be noticed that the calling party when replacing his handset did not disconnect his coin magnet, operate his lock-out relay or his restoring magnet, but merely operates his hookswitch springs. He may at any time come back on the line by removing his handset to connect to relay 360 in repeater 200. Simultaneously ground is applied from the first operated ringing key of cord 510 over conductor T2 to relay 210 which operates to connect conductor R2 to the −L line at contacts 212 and apply a return ground to the +L line at contacts 214 each time a ringing key is operated. The ringing frequencies of the called and calling parties are then alternately sent over the −L conductor from conductor R2, a condenser corresponding to 14, a spring corresponding to 3 and a ringer corresponding to 90 at each party line station and back over the +L conductor to ground at contacts 214 to operate the ringers individual to the applied frequencies at the called and calling stations in any well-known manner to signal the called party and calling party.

If the called party does not answer within a prescribed time period, the operator simply discontinues ringing both parties so that the calling party comes back on the line. Lock-out potential is not applied to the other stations when any party now connects to repeater 200 as relay 270 is operated to maintain the lock-out circuit open. Relay 360 operates over a circuit already described to operate relay 410. Contacts 363 open to extinguish the cord lamp to inform the operator that someone has answered. The operator informs the party, if the calling party is on the line, that the called party has not answered. He then proceeds to replace his handset to release relay 360 and 410 and relight the cord lamp over a previously described circuit.

The operator must refund manually. She inserts coin cord 520 in jack J2. This insertion may be made before the calling party hangs up without interfering with the conversation. It is also desirable that the operator lock-out all other stations to ensure that the coin magnet gets its full operating potential. Therefore before the calling party replaces his handset K9 is operated to forward −110 volt locking potential potential over lead S2 and contacts 274 to all locking relays except that of the calling party over a circuit similar to that described for the unlocking potential supplied from key K8. The lock-out relay at each station except P1 now operates to disconnect its respective station and only station P1 remains connected to repeater 200.

If for any reason the operator has doubts as to who is on the line she may test for a deposit. This is important, if only one party came on the line and that party requests her to complete a call to another line. Key K9 is operated with cord 510 inserted in jack J3 to lock-out all stations having unoperated hookswitches. Key K3 is then closed to forward ground over lead T1, contacts 468, lead 269 to relay 260. It operates to close contacts 262 and 263. At contacts 263 an obvious circuit is completed to relay 230 to in turn operate relay 220. The +L conductor connected over a previously described circuit to ground through coin magnet 50 is now connected through contacts 213 and 224 to contacts 262 and lead R1. No circuit is completed to relay 250 as contacts 261 are open. The −L conductor is likewise connected through contacts 211, 222 and 262 to lead R1. If coin springs 7 are closed indicating a deposit, ground is forwarded over lead R1 from the −L lead, chain contacts of K1 and K2 to battery through the winding of relay 530. Relay 530 operates to close contacts 531 to light coin deposited indicating lamp 540. If the called party was on the line, and the calling party had not answered, operation of key K9 disconnected the coin magnet of the calling party from the +L lead and relay 530 does not operate and the operator does not get a signal indicating a coin deposit. Thus the operator for various purposes may perform a test to determine if a coin is deposited and take appropriate action. This test may be performed at the end of an ordinary local call without operating K9 to determine if the coin magnet and restoring magnet have operated.

When the operator desires to refund, she releases K3 to open the circuit to relay 530 which extinguishes lamp 540 and operates K1. Ground is again provided over lead T1 to operate relay 260 and −110 volt refund potential is forwarded over lead R1, contacts 262 and a portion of the coin magnet operating circuit previously described to operate relays 60 and 40 and coin magnet 50 as previously described. If the operator desires she may operate key K1 before releasing K3, as operation of K1 opens the circuit to relay 530. The operator now removes her plug from J1 to remove ground from lead H at contacts 472 and release relay 460, which in turn releases relay 440 at contacts 464. The plug must be removed after the party on the line hangs up and after refund potential is applied in a manner just described, to prevent a collect operation of the repeater. Contacts 467 open one circuit to the lower winding of 430 but it holds from contacts 275. Release of 440 opens the circuit to relay 370. Release of relay 370 now operates relay 230 as previously described. Relay 220 operates for no purpose as no circuit can be completed to relay 250 as coin springs 7 at the paystation are open. Relay 240 is therefore not operated. Relays 310 and 270 release in turn as before described. The holding circuit for the lower winding of relay 430 is opened at contacts 275, but relay 430 does not release until relay 220 opens contacts 227. Relay 230 releases as contacts 271 are open to in turn release relay 220. Unlocking battery is now returned over lead A to unlock all locked out stations all as previously described.

In the event the called party answers the call relay 360 is energized over a circuit similar to the previously described circuit for station P1. Relay 410 is energized. The operator's cord lamp is extinguished when contacts 363 open and she stops her ringing operation. The calling party on being signalled by not hearing the periodic ring removes his handset. When the calling party removes his handset, his transmitter and receiver are connected to the +L and −L lines to thereby complete a talking circuit to the party at the other paystation on the line. Talking battery is forwarded from the left side of relay 360. The operator on hearing both parties on the line closes key K9 to forward −110 volt locking battery over lead S2 and a circuit already described to operate the lock-out relay at each station not on the line and lock those stations out. Lock-out battery cannot be sent as on an originating call as relay 270 is operated. She then disconnects her plugs from jacks J1 and J3 respectively. The operator may plug back in at any time to monitor the conversation without operating any relays.

When both parties disconnect relay 360 releases to release relay 410. Relay 410 at contacts 412 opens the circuit as previously described to relay 460. Relay 460 releases to open the circuit to relay 440 which in turn releases to open the circuit to relay 370. Relay 370 releases to open the contacts 378′ for supplying busy ground at the connector bank. This ground is now supplied from contacts 276 as previously described. Contacts 372 close to complete a previously described circuit for relay 230. It operates to energize relay 220 which in turn completes a previously described circuit for relay 250 through the calling party's coin springs 7. Relays 310 and 270 are respectively released as already described. Ground for busying the C′ lead to the connector banks is now furnished from ground at contacts 232 and 277 to contacts 379′ as contacts 276 open. Relay 220 holds the lower winding of relay 430 energized from contacts 227 over conductor 437 after contacts 275 open. Pulser P6 now operates relay 240 and +110 volt collect potential is applied to the desired coin magnet and restoring relay to operate them in a manner previously described and after which relays 250, 240, 230 and 220 release as already described. Relays 220 and 230 release to release relay 430 at contacts 227 and remove busy ground from C′ at contacts 232 respectively so the repeater 200 is available to other callers. The operator on noting that lamp 470 is extinguished may test to determine if the deposit is collected as previously described, and if it has not been collected may then manually collect by operating key K2 as described.

A calling or called party by remaining on the line after the other party hangs up, maintains relay 360 operated and prevents the repeater performing a collect operation until he does. Relay 440, which maintains relay 370 operated, cannot be released unless both the subscriber and the operator have disconnected as relay 440 is under their mutual control through contacts of relay 460. Relay 370 maintains the trunk seized and therefore relay 440 must be released to idle the trunk. Thus once an operator has answered the trunk is under control of both the operator and subscriber, and the subscriber is not able to complete any call over the selector as the selector cannot be seized as long as relay 440 is operated. The operator may of course change plugs without upsetting the connection as long as relay 360 is held operated by a party on the line. Either party, if alone on the line, may signal the operator by jiggling his hookswitch to rapidly release and reoperate relay 360 to flash the operator's cord lamp and signal her. She may then plug in and perform legitimate services requested by the party on the line. She may of course test for a coin deposit and perform a coin collect or refund operation in the manner explained. It will be observed that a party operating his hookswitch to flash the operator is in no danger of being locked out once relay 270 is operated, nor can he unlock other stations while relays 310, 270 or 220 are operated.

*Toll calls*

A party at one of the paystations such as P1 initiates a toll call by seizing the repeater 200 and selector 490 as previously described and dialing the digit zero on the selector to step the selector to its tenth position where its normal post springs close to send ground back on lead EC for operating relay 440 as previously described. The circuit to relay 450 is opened and it restores to release the selector. Relay 440 operates to signal the operator by lighting lamp 471. The operator inserts her plug in jack J1 to operate the aforementioned relays 460 and 430 and converse with the calling party. In case of any question as the amount the calling party has deposited to call her, the operator manually refunds any coins in the coin hopper before completing the connection in a manner already described for refunding coins on an uncompleted reverting call. That is she inserts coin cord 520 into jack J2 and operates key K3 to test for the deposit of a coin, after which (the calling party having hung up), she operates key K1 to refund the deposit all in a manner previously described. In this type of call, however ringing cord 510 is not inserted in jack J3 for the purpose of unlocking the other stations on the party line as was done on a reverting call. The calling party may come back on the line to operate relays 360 and 410 as long as the operator has not disconnected. She secures the information desired and then extends a toll connection in any well-known manner over her cord circuit to the desired called party and on securing the called party instructs the calling party to deposit the appropriate coin value before completing a talking circuit from repeating coil 402 through her cord circuit in any well-known manner. The operator identifies the amount deposited by the tones generated in coin transmitter 12 and sent over the trunk conductors −L and +L, the repeating coil 402 and the operator's receiver.

The operator by observing when her cord lamp lights, knows when the calling party has disconnected to release the connection. She may also time the call thereby, and from time to time interject for the purpose of requesting the deposit of more coins. Noticing her lighted cord lamp, she merely removes her plug from jack J1 to release relay 460 to in turn release relay 440. If her plug was removed, relay 460, held operated over contacts 465, 412 and 374, releases on restoration of relay 410 to momentarily light lamps 471 over contacts 445 and 466 to signal release of the trunk. Relay 440 releases immediately thereafter at contacts 464 to open the lamp circuit. Relay 440 also releases relay 370. Relay 430 is held operated by relay 270. Relay 310 and 270 start to release. Relay 230 operates to operate relay 220, which holds relay 430 and operates 250. Relay 240 is now operated from pulser P6 and collect potential is applied to the coin magnet. Relays 250, 240, 230, 220 and 430 then release. All this has been described.

If this is a delayed toll call, wherein the operator cannot immediately secure the called party, she instructs the calling party to hang up and informs him that she will ring him when she secures the desired called party. As described before on a reverting call, release of the connection by the calling party only releases relays 360 and 410 as long as the operator maintains her plug in jack J1. The repeater 200 is therefore held as long as the operator desires. She may release the entire connection on securing the desired information and thereby allow other calls to be established through repeater 200 as described. By later inserting her plug in jack J1, when the repeater is idle, she reoperates relay 460 and at contacts 464 operates relay 440. Relay 440 reoperates relay 370 which busies the repeater to incoming calls. Relay 430 is operated from relay 460 to prepare for a collect operation. Relay 320 is not operated so no party line stations are locked out. If her plug had not been removed from jack J1 while securing the called party, the aforementioned and relays 310 and 270 are operated and all party line stations are locked out. She then inserts the plug of her ringing cord in jack J3 and operates K8 to unlock all the stations as previously described. This is of course unnecessary if she had previously released the repeater. She now operates one of the keys K4, K5, K6 or K7 individual to the calling party's ringing frequency to signal him and when he answers as indicated by relay 360 darkening her answer lamp, requests the deposit of a certain coin value. She then completes the connection through her cord circuit. She also locks the other party line stations out by inserting cord 510 in jack J3 and operating K9 all in a manner previously described. At the end of the call coins are collected in a manner already described and the repeater 200 released. The operator, it will be noted, may on her own volition establish a connection to any one of the stations on line 150, by employing the procedure outlined above.

*Incoming calls*

A local subscriber such as S8 or an incoming toll operator extends a connection over the well-known Strowger type switching apparatus such as 390 to a connector such as 395. The connector 395 is operated by two dialled digits to find the repeater 200 and connect to leads EC′, the trunk conductors +L′ and −L′, and C′. The connector switch tests for battery over lead C′, contacts 379′, 277, 233 and through the lower winding of relay 340. If battery is found through the lower winding of relay 340, the switch through relay (not shown) of the connector switch is operated and lead C′ is grounded to operate relay 340 over the above circuit. Relay 340 at contacts 347 opens a point from lead H to relay 460 and prevents the operator from interfering by plugging in to operate relay 460. At contacts 345 it opens a point in the circuit to relay 230, and at contacts 346 busies the trunk at the operator's position by lighting lamp 470 over lead B. Contacts 342 and 344 close to connect the +L′ and −L′ conductors respectively to conductors +L and −L respectively through contacts 213 and 223 and 211 and 221 respectively. In the meantime the third digit, dialled on the connector switch, results in the switch selecting the harmonic frequency individual to the called substation associated with the repeater 200, and as the connector switch through relay is operated the ringing frequency is sent out over the —L' conductor, contacts 342 and the already described portion of the ringing circuit and is returned over contacts 344 and the +L' conductor to operate the ringer corresponding to 90 at the desired station and signal the called party. Simultaneously ring back tone is returned to the calling party from the connector in the well-known manner. As previously mentioned the present invention is not limited to an arrangement utilizing a three digit connector such as described above, and it is here described only for the purpose of illustrating the manner of operation of the invention. When the called party removes his handset from the hookswitch, the substation ringer is cut-off at contacts 3, and a D.C. circuit for operating the connector ring cut-off relay (not shown) is completed through the already described paystation loop, excluding respectively contacts 341, coil 402, contacts 376, relay 360 and contacts 343 and 377 and including contacts 342, the —L' lead to battery on one side of the cut-off relay and from ground on one side of said relay over the +L' lead and contacts 344. The ring cut-off relay operates and extends the loop to operate the relay (not shown) for reversing battery on the trunk to the connector and also completes a talking circuit to the calling party. The parties may now converse. Ground is in the meantime extended, over lead EC' by the switch through relay, to battery through the lower winding of relay 330. It operates and completes a circuit for relay 320 over contacts 348, 334 and 314 so that relays 320, 310 and 270 operate as previously described to apply lock-out battery momentarily to the non-called stations. At contacts 332 it opens another point between lead H and relay 460. The holding circuit for relay 310 is completed now over contacts 348, 334 and 313 as relays 370 and 410 are not operated. At contacts 333 ground is forwarded from lead EC' to operate the upper winding of relay 340. Relay 330 closes contacts 335 to complete a circuit for its upper winding from contacts 278. Relay 270 opens the circuit to the lower winding of relay 340 at contacts 277, however it is held operated by the described circuit to its upper winding. Relay 270 also busies the repeater to incoming calls by ground forwarded over contacts 276 and 379' to C'.

The release of the connection is under control of the calling party so that when the circuit to the line relay of the connector is opened by the calling party it releases. The called party line subscriber on replacing his handset only opens the circuit over the trunk conductors to the connector battery reversing relay. He cannot signal the operator. When the calling party releases the connector, ground is removed from lead EC' to de-energize the upper winding of relay 340 and the lower winding of relay 330. Relay 340 restores to open the circuit to relay 310 at contacts 348. It also reconnects the paystation circuit to coil 402 and relay 350 at contacts 341 and 343. Relay 350 cannot operate, however, as the coin springs are open, and therefore it receives no operating ground. The upper winding of relay 330 remains energized, however over contacts 278 and 335, and it releases only when relay 270 releases to open contacts 278. Thus even after contacts 347 close, the operator cannot interfere until contacts 332 close. Relay 310 on releasing opens the circuit to relay 270 at contacts 312, and it releases to restore its contacts. Relay 230 is not operated, when contacts 331 close as contacts 271 are open. Therefore relay 220 is not operated and no coin operation is performed. Release of relay 270 does not recomplete a circuit to the lower winding of relay 340 as ground is already off lead C' and the repeater is now available to other callers. The operator's busy lamp 470 was originally operated from contacts 346 and is held operated only until relay 270 opens contacts 272. Contacts 311, 321, 273 and 226 are closed to connect lead A to +110 volt battery for unlocking out stations.

In the case of a reverse charge call, the connection must be made through an operator having access to the repeater 200 from a jack such as J1. This is because she must control the connection through her cord circuit. The operator noticing the busy lamp 470 is extinguished plugs in at J1 to operate relay 460. Relay 440 operates to in turn operate relay 370. Relay 430 also operates to prepare for a collect operation. The operator now plugs in her ringing cord 510 and as all stations are unlocked merely operates the proper key to signal the called party. The called party on answering operates relays 360, 410, 320, 310 and 270 as previously described. Relay 320 of course releases immediately. The call is then completed when the called party deposits the proper coin value in the same manner as on outgoing delayed toll call. The call is later released and coins collected as previously described.

I have described my invention in its particulars but because of its many applications, versatility, and breadth, what I think is the scope of my invention is incorporated in the following claims.

What is claimed is:

1. For use in a telephone system having a group of party line paystations having a connection to a central office through which a call may be automatically completed to a called subscriber from one of said paystations on deposit of a coin and the dialling of said called subscriber's number and at which office an operator's position including means operable for establishing a reverting call to another one of said paystations or a toll call is signalled on initiation of a call from said one paystation and on the deposit of a coin and the dialling of a predetermined digit, means at each paystation for controlling the connection of its paystation to said central office, means at said central office operated on initiation of a call from one of said paystations and deposit of a coin thereat for operating said controlling means at each other paystation to disable said other paystations to prevent initiation of a call therefrom, means at said position operable for disabling said control means on a reverting call to enable a call from one of said paystations to be completed to another of said paystations, means at said central office automatically operated on termination of a completed call of any type for causing a coin at said paystation to be collected, said last means operated for causing a coin to be refunded on termination of an uncompleted call to said called subscriber, and means operable from said position on termination of an uncompleted toll or reverting call for causing a coin at said paystation to be refunded.

2. For use in a telephone system including associated substations having an individual coin receiving, collecting and refunding mechanism and a central office connected to said substations by means of a group of conductors common to said substations and over certain of which conductors calls may be automatically established to a regular station on the deposit of a coin and the dialling of a certain number and over which an operator's position is signalled on the dialling of a predetermined digit, a lock-out relay at each substation for controlling said certain conductors, means at said central office operative responsive to one of said substations initiating a call over said certain conductors and deposit of a coin in said receiving mechanism for operating said lock-out relay at each other associated station for disconnecting said other associated stations from said certain conductors and for enabling the completion of a call to said regular station responsive to the dialling of said certain number, said means also operative in response to an incoming call from said regular station over said certain conductors to one of said substations for operating said lock-out relay at each other station to disconnect said other substations from said certain conductors, means at said central office operable from said operator's position when said predetermined digit is dialled to signal said position for disabling said lock-out relay at each station to connect all said stations to said certain conductors to enable a connection between a calling and a called one of said associated stations to be completed, means at said position operable for signalling said called associated station and means at said called station operable on answer by said called associated station for completing said connection to said calling station over said certain conductors, means at said central office operated on termination of a completed call to any station from one of said substations for operating said collecting mechanism to collect a coin deposited in said receiving mechanism, said last means operated on termination of an uncompleted call to a regular called line for operating said refunding mechanism to refund a coin deposited in said receiving means, and means at said operator's position operable if a call from said calling associated station to said associated called station is uncompleted for operating said last mechanism to refund a coin.

3. For use in a telephone system including substations having an individual coin receiving, collecting and refunding mechanism and connected to a central office by means of a group of conductors common to said stations, a lock-out relay with an armature at each substation connected to one of said conductors, said armature arranged to be operated by said relay for controlling certain of said conductors in accordance with the polarity of the potential applied to said relay and constructed to remain in the position to which it is operated, a source of potential of one polarity at said central office, means at said central office normally operated for applying the potential of said one polarity from said source to one of said conductors to operate said relays, each said relay thereby maintaining its respective armature in a position whereby said certain conductors are connected to all substations, a source of potential of another polarity, means at said central office operated responsive to one of said substations initiating a call and on deposit of a coin in said receiving means for extending a potential of said other polarity for a predetermined time to said one conductor for operating the lockout relay at each of said other substations to cause the armatures thereof to disconnect said other substations from said certain conductors, said respective armatures remaining in position to maintain said certain conductors disconnected after said predetermined time, and means operable on termination of a completed call for applying said potential of said one polarity to one of said certain conductors to operate said collecting mechanism at said one station to collect a coin deposited in said receiving means, said last means operable on termination of an uncompleted call for applying said potential of said other polarity along said one certain conductor to operate said refunding mechanism at said one station to refund a coin deposited in said receiving means.

4. For use in a telephone system including substations and a central office connected to said stations by means of a group of conductors common to said stations, control means at each station for controlling certain conductors of said group, means at said central office operative in response to one of said stations initiating a call over said certain conductors for operating the control means at each other substation to thereby disconnect said other substations from said certain conductors until said call is terminated, said means also operated in response to an incoming call to any one of said substations for operating the control means at each other station to disconnect said other substations from said certain conductors until said incoming call is terminated, and means at said central office operable at certain times for disabling an operated control means at each of said other stations to thereby reconnect all said other stations to said certain conductors to enable a call between certain of said substations to be completed over said common group of conductors and thereafter operable for operating the control means associated with a station other than said certain stations to disconnect said other stations from said certain conductors until said last call is terminated.

5. For use in a telephone system including substations having an individual coin receiving, collecting and refunding mechanism and a central office connected to said substations by means of a group of conductors common to said substations, control means at each substation for controlling certain conductors of said group, means at said central office responsive to one of said substations initiating a call over said certain conductors and deposit of a coin in said receiving mechanism for operating said control means at each of the other stations for disconnecting said other stations from said certain conductors, said means also operated in response to an incoming call to one of said substations for operating said control means at each other station for disconnecting said other substations from said certain conductors, means at said central office operable at certain times for disabling said control means at each station to connect all said stations to said certain conductors to enable a connection between a calling and a called one of said stations to be completed and thereafter operable for operating said control means to disconnect all stations except the calling and called stations from said certain conductors until said last call is terminated, and means operated on termination of a completed call from any one of said stations for operating said collecting mechanism to collect a coin deposited in said receiving mechanism, said last means operated on an uncompleted call for operating said refunding mechanism to refund a coin deposited in said receiving means.

6. For use in a telephone system including associated substations having an individual coin receiving, collecting and refunding mechanism and a central office connected to said substations by means of a group of conductors common to said substations and over certain of which conductors calls may be automatically completed to a regular called station, a lock-out relay at each substation for controlling said certain conductors, a source of potential, means at said central office operative responsive to one of said substations initiating a call and depositing a coin in its receiving mechanism for applying a potential from said source over one of said conductors to operate each lock-out relay at the other stations for disconnecting said other stations from said certain conductors, said means also operative in response to an incoming call to one of said substations for applying said potential over said one conductor on answer by the called station to operate said lock-out relays for disconnecting said other substations from said certain conductors, a second source of potential, means at said central office operable at certain times for applying a potential from said second source over said one conductor to disable said lock-out relay at each station to thereby reconnect all said associated stations to said certain conductors to enable a call between a calling and a called associated station to be completed over said group of conductors, and means at said central office operated on termination of a completed call to any station for applying a potential from said second source of potential over said certain conductors to operate said collecting mechanism to collect a coin deposited in the receiving mechanism thereof, said last means operable on termination of an uncompleted call for applying a potential from said first source over said certain conductors to operate said refund mechanism to refund a coin deposited in said receiving means.

7. For use in a telephone system including substations having an individual coin receiving, collecting and refunding mechanism and connected to a central office by means of a group of conductors common to said stations and over certain of which a call may be completed to a called subscriber from one of said stations, a lock-out relay at each substation for controlling the connection of said certain conductors to its respective station, a source of potential at said central office, means for normally applying a potential from said source to one conductor of said group for maintaining said lock-out relays at all said substations in a position wherein said certain conductors are connected to all said stations, another source of potential at said central office, means at said central office operated responsive to one of said substations initiating a call and on deposit of a coin in said receiving mechanism for applying said potential of said other source to said one conductor for operating the lock-out relay at each of said other substations to disconnect only said other substations from said certain conductors, and means operable on termination of a completed call to said called subscriber for applying said potential from said first source to one of said certain conductors to operate said collecting mechanism at said one station to collect a coin deposited in its receiving means, said last means operable on termination of an uncompleted call for applying said potential from said other source to said one certain conductor to operate said refunding mechanism at said one station to refund a coin deposited in said receiving means.

8. For use in a telephone system including substations each having an individual coin receiving, collecting and refunding mechanism and connected to a central office by means of a group of conductors common to said substations, said central office having an operator's position and switching apparatus whereby a call from one of said stations may be automatically extended to a called subscriber having a directory number on the dialling of said number at one of said substations over certain of said conductors, a lock-out relay at each substation for controlling the connection of said certain conductors to its respective station, means at said central office responsive to one of said substations initiating a call and the deposit of a coin at the receiving mechanism of said one substation for operating the lock-out relay at each other substation to thereby disconnect said other substations from said certain conductors, means thereafter operable on the dialling of the directory number of said called subscriber for first seizing said switching apparatus and for automatically extending a call over said switching apparatus to said called subscriber, said last means operable on the dialling of a predetermined digit for signalling said position and for establishing a talking circuit between said position and said certain conductors for the purpose of requesting an operator at said position to establish a call to a called one of said substations, means thereafter operable from said position for disabling the lock-out relays at each of said stations to thereby connect all said stations to said certain conductors, means thereafter operable from said position for signalling a called one of said stations over said certain conductors, means operable on answer by said one called station for completing a call between said calling and said called station, means at said central office operable responsive to the termination of any completed call for automatically operating the collecting mechanism at said calling station to collect a deposited coin, said last means including apparatus for automatically operating the refunding mechanism at said calling station to refund a deposited coin if the call to said called subscriber is not completed, and means operable from said position for operating said refunding mechanism to refund a deposited coin if the call is not completed to said called substation associated with said group of conductors when said called substation is signalled over said certain conductors.

9. In a telephone system, a party line having a plurality of substations connected thereto and having means for extending connections therefrom either to another subscriber line or to an operator's position, lock-out means controlled from any substation responsive to the initiation of a call therefrom for locking out all other substations on said line, means controlled by the operator at said position, when a call is extended thereto from said line for rendering said lock-out means ineffective for completing a connection between a calling and a called substation on said line, and for thereafter reoperating said lock-out means to lock-out all substations except the calling and called substations.

10. In a telephone system having switching apparatus, a party line, a repeater individual to said party line, a plurality of substations connected to said party line and including dial means at each station operable for extending a call from said repeater through said switching apparatus, an operator's position individual to said repeater, means for signalling said position and for preventing the establishment of a connection between said position and said repeater in response to the operation of said dial means at one of said stations in accordance with one predetermined number, and means for signalling said position and enabling the establishment of a connection to said repeater and one station over said line from said position in response to the operation of said dial means at one station in accordance with another number.

11. For use in a telephone system including a number of paystations having a common connection to a central office and each having an individual coin receiving means and a control magnet for controlling a coin deposited in said receiving means, disabling means at each of said stations, a circuit having a particular potential therein established over said common connection to said central office on initiation of a call from one of said stations and over which circuit a call may be controlled from said one station, a circuit having another potential therein, means operable on initiation of a call from said one station for completing said last circuit for operating said disabling means at said other stations for preventing said other stations from connecting to said common connection, and means operated on termination of a call for applying said other potential over said common connection to said magnet for operating said magnet to dispose of a coin in said receiving means.

12. In a telephone system including a group of paystations having a common connection to a central office and means at each station operable for extending a call from a calling one of said stations over said common connection and over switching apparatus at a central office to a called line and coin control means at each station for receiving and for collecting or refunding a coin deposited at one of said stations, disabling means at each of said stations, means at said central office operated on deposit of a coin at a calling one of said stations for applying a particular potential of one polarity to the disabling means at said other stations to operate said disabling means for preventing said other stations from initiating a call, means at said central office automatically operated for applying a particular potential of another polarity of said coin control means at said one station to operate said means for collecting a deposited coin on release of a call completed to said called line, said means automatically operated on release of an uncompleted call to said called line for applying said particular potential of said one polarity to said coin control means at said one station to operate said means for refunding a deposited coin, and means thereafter automatically operated for applying said particular potential of said other polarity to said disabling means at said other stations for operating said disabling means to enable any of said other stations to initiate a call.

13. In a system such as claimed in claim 12, an operator's position at said central office having access to said party line and including a source of said particular potential of said one and other polarities, means at said position operable at will for applying said potential of either polarity to operate said disabling means at said stations accordingly, and means at said position operable at will for applying said potential of either polarity to said coin control means to operate said last means accordingly to collect or refund a deposited coin.

14. For use in a telephone system having a party line including a number of paystations connected thereto each having means for receiving a deposited coin and disposing of said coin and means at each station for controlling the connection of its associated station to said party line, said controlling and disposing means operated on the application thereto of a potential other than normal exchange battery and equipment at a central office for extending a call from one of said stations to a called subscriber or to an operator's position, a source of said potential, means associated with said equipment and automatically operated on a call to said called subscriber for applying said potential from said source to said control means at the other stations to disconnect said stations from said line and for applying said potential to said coin means for disposing of a coin deposited at said calling station and thereafter applying said potential to said control means at the other stations to connect said other stations to said line, a second source of said potential at said operator's position, and means at said operator's position operable at will on a call directed thereto for applying said potential from said source at said position to said control means and said coin disposing means.

15. For use in a telephone system including at least three substations each having an impulse sender for dialling digits and disposing mechanism and disabling means, said substations connected to a central office by means of a common group of conductors, means at said central office operable responsive to one of said substations initiating a call for operating said disabling means at the other substations for preventing any of said other substations from initiating a call, said means also operated in response to an incoming call to one of said substations for preventing any of the other substations from responding to or initiating a call, and means operable if a predetermined digit is dialled for disabling said last means to enable a connection between any two of said substations to be completed and for thereafter preventing initiation of a call by any of the other substations until said last connection is terminated.

16. For use in a telephone system having a party line with a paystation connected thereto and including means associated with said party line whereby a connection may be extended from said paystation over said party line to certain common central office switching equipment, said paystation having a mechanism for receiving coins, a lock-out means at each station, means at said central office operated over said party line on initiation of a call from said paystation and on deposit of a first coin in said mechanism for preventing a connection from being established to said party line and paystation, said means also effective to operate said lock-out means at each non-calling station to prevent the extension of a call therefrom, and means operated on deposit of a second coin at said paystation for operating said associated means to permit the extension of a connection from said party line and paystation to a called line via said common central office switching equipment.

17. A lock-out arrangement for a party line having a number of stations connected thereover to a central office, a relay at each station, a common conductor extending from said central office to each relay, means at each station whereby its individual relay is disconnected from said conductor on initiation of a call therefrom, and means at said central office effective on initiation of a call from any of said stations for returning an electrical pulse of a predetermined time duration along said conductor for operating each connected relay to disconnect its associated station from said party line.

References Cited in the file of this patent

UNITED STATES PATENTS

| | | |
|---|---|---|
| 2,001,095 | Deakin | May 14, 1935 |
| 2,180,963 | Pearce | Nov. 21, 1939 |
| | (substituted for Australian 103,696) | |
| 2,245,799 | McClew et al. | June 17, 1941 |
| 2,307,855 | Pearce | Jan. 12, 1943 |
| 2,355,139 | Bellamy | Aug. 8, 1944 |
| 2,367,769 | Goddard | Jan. 23, 1945 |
| 2,583,783 | Lomax et al. | Jan. 29, 1952 |
| 2,673,243 | Lomax | Mar. 23, 1954 |
| 2,717,925 | Lomax | Sept. 13, 1955 |

FOREIGN PATENTS

| | | |
|---|---|---|
| 103,696 | Australia | Apr. 8, 1938 |